UNITED STATES PATENT OFFICE.

HANS A. FRASCH, OF CLEVELAND, OHIO, ASSIGNOR TO THE GRASSELLI CHEMICAL COMPANY, OF SAME PLACE.

PETROLEUM SULFO-ACID.

SPECIFICATION forming part of Letters Patent No. 518,989, dated May 1, 1894.

Application filed April 19, 1893. Serial No. 471,016. (Specimens.)

*To all whom it may concern:*

Be it known that I, HANS A. FRASCH, a citizen of the United States, residing at Cleveland, in the county of Cuyahoga and State of Ohio, have invented certain new and useful Improvements in the Art of Manufacturing Sulfo-Acid from Petroleum; and I do hereby declare that the following is a full, clear, and exact description of the invention, which will enable others skilled in the art to which it appertains to make and use the same.

This invention relates to the utilization of such hydrocarbons as natural mineral oil or petroleum for obtaining a body or product which may be employed for producing dyestuffs or color bases.

In practicing my invention, I treat the petroleum body with sulfuric acid until sulfonation is effected and then separate the product into what by analogy may be termed alpha and beta acids, which are further treated for colors or dyestuffs.

The invention herein consists in the process of obtaining these two acids, also the process of separating the alpha acid; and also the alpha acid.

In carrying out my invention, I subject crude petroleum, or its distillates or products, residual or otherwise, to the action of sulfuric acid until all the aromatic hydrocarbons, olefines, naphthenes and unsaturated hydrocarbons in the oil are taken up in the acid as oxidized and corresponding sulfo products. The proportion of acid to oil varies greatly according to the quality of the oil being treated. Crude oil requires about twenty-five per cent. while distillate requires from two to ten per cent. and sludge from nothing to five per cent. according to the quantity of acid remaining in the substance.

In all cases the treatment proceeds alike substantially as follows: The mixture of acid and oil is agitated, mechanically or by a forced current of air, until a sample from which the acid has been permitted to settle will discolor little if any upon the addition thereto of fresh concentrated sulfuric acid. The mixture of acid and oil is then permitted to rest until the acid is separated from the oil, when the acid containing the aromatic hydrocarbons and tarry substances is drawn from the oil. The remaining oil may be washed and further utilized for petroleum products as is ordinary crude oil. The acid mixture taken from the oil is then heated until the hydrocarbons contained therein are converted into sulfo combinations and oxidized products, and this treatment is of the essence of my invention.

Sulfonation may be effected without heat by keeping the mixture agitated for a long time, say, from four to eight weeks, and even longer, thus permitting the acids to act upon the hydrocarbons. Fuming or so-called Nordhausen sulfuric acid or a mixture of chromic and sulfuric acids may also be employed for sulfonation. The requisite degree or extent of sulfonation is determined when the bulk of a test sample will dissolve in a hot solution of alkali. The free sulfuric acid is then removed, and this may be readily accomplished by neutralization or repeatedly washing the mixture with cold water, or by precipitating the sulfo compound from the acid. After the free acid is removed, the residuum is heated with water until the water is saturated with the more soluble sulfo products. The solution is left to settle, whereby the soluble products and the insoluble matter and oily matter are separated. The soluble products are then drawn off and consist of a mixture of different higher or lower sulfo products. To separate these products, carbonate of lime or caustic lime is added, with or without heating until precipitation ceases, whereby a soluble and an insoluble calcium salt are obtained. Any other substance which will form a soluble and an insoluble salt with the sulfo product may be substituted for the calcium. The solution is separated from the precipitate. This solution contains what by analogy I term the alpha acid, and the sulfo acid is separated from it by the addition of hydrochloric acid, or any other acid that will displace the calcium. Instead of obtaining the acid directly as just described, it may be obtained indirectly by converting the calcium salt into a salt of potassium, ammonia, &c., and then separating the sulfo acid by the addition of hydrochloric acid or the like. This alpha sulfo acid is soluble in water, glycerin and alcohol and partly soluble in most of the aromatic hydrocarbons. All its solutions are of a greenish yellow, with a distinct greenish fluorescence. Its solution dyes wool and silk, without mordant, a greenish yellow. The solid substance is greenish black in pure state, apparently not crystalline, frangible and melts or runs at about 180° Fahrenheit. Its calcium salt is soluble in water, as are also all the salts of the alkalies and the earthy alkalies and most of the metallic oxids. The solution of the salts is of a bright clear yellow, dyeing wool and silk, without mordant, in acidulated solution, a bright canary yellow; and these solutions also exhibit the greenish fluorescence. The acid when exposed to high temperature emits the characteristic odor of burning coal oil. The acid when reacted upon by nitrous or nitric acid in weak solution forms azo and nitro bodies. If exposed to the action of chloride of lime or other oxidizing agent, it assumes a reddish-brown color, as also do the calcium and sodium salts thereof. It is not affected by concentrated hydrochloric acid. If heated to red heat it decomposes into sulfur dioxid and a greenish-black oil.

What I claim is—

1. The method of manufacturing sulfo acids from petroleum, which consists in sulfonating the aromatic series of hydrocarbons contained in petroleum, natural mineral oil, or the distillates or residuums thereof, leaching the sulfonated product with cold water, subjecting the remainder to the action of hot water, decanting or otherwise separating the matter soluble in hot water, and then adding a base, such as lime, to the hot water solution, and finally liberating the acids by combining the base with suitable reagents, such as hydrochloric acid, substantially as described.

2. The method of manufacturing sulfo acids from petroleum, which consists in sulfonating the aromatic series of hydrocarbons contained in petroleum, natural mineral oil, or the distillates or residuums thereof, leaching the sulfonated product with cold water, subjecting the remainder to the action of hot water, decanting or otherwise separating the matter soluble in hot water, and then adding a base, such as lime, to the hot water solution, separating the soluble and insoluble sulfo salts thereby obtained, by filtration or other means, and liberating from the solution of the soluble salt an acid by the addition of a suitable reagent, such as hydrochloric acid, substantially as described.

3. As an article of manufacture, a sulfo acid, unaffected by concentrated hydrochloric acid, decomposing into sulfur dioxid and a greenish-black oil when heated to red heat, of greenish-black color when solid, and of greenish-yellow coloration in solution, soluble in water, alcohol, acetone, amyl-alcohol, hot anilin, nitro-benzene and glycerin, having a greenish fluorescence in solution, capable of dyeing silk and wool, without mordant, a yellowish color, whose calcium salt is soluble in water, and whose alkaline salts are of a yellow color and are capable of dyeing wool and silk a bright yellow, substantially as described.

Witness my hand to the foregoing specification this 6th day of April, 1893.

HANS A. FRASCH.

Witnesses:
H. T. FISHER,
GEORGIA SCHAEFFER.